Feb. 4, 1930.  R. H. WHITELEY  1,746,020
BEARING
Filed May 2, 1928
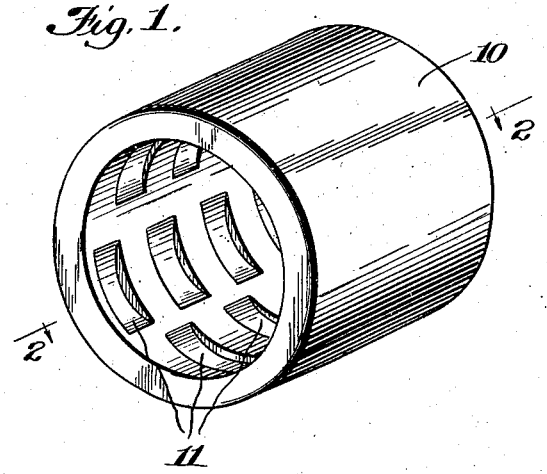
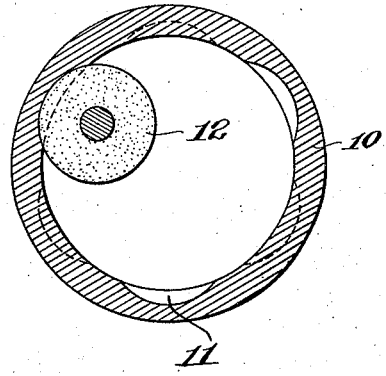
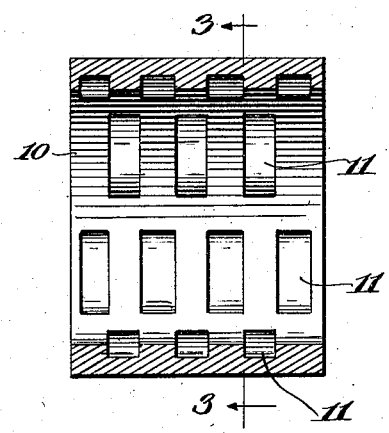
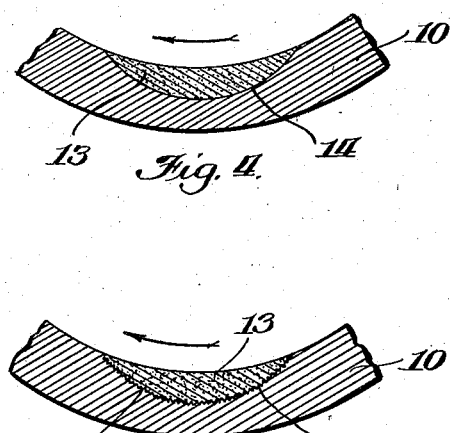
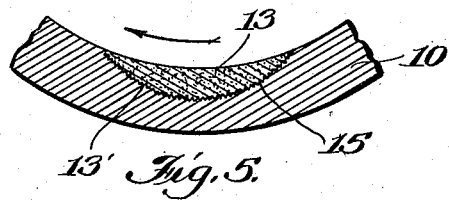
Inventor
Robert H. Whiteley
By Williams, Bradbury, McCaleb & Hinkle
Attys.

Patented Feb. 4, 1930

1,746,020

UNITED STATES PATENT OFFICE

ROBERT H. WHITELEY, OF OAK PARK, ILLINOIS, ASSIGNOR TO HIMSELF AS TRUSTEE

BEARING

Application filed May 2, 1928. Serial No. 274,409.

My invention relates to bearings and pertains more particularly to the so-called oilless bearing wherein one of the bearing members is provided with recesses or pockets packed with a graphite compound or other solid or semi-solid lubricant prior to assembly of the bearing.

An object of my invention is to provide a new and improved bearing.

Another object is to provide a self-lubricating bearing wherein the lubricant containing pockets carry part of the bearing load.

Another object is to provoide a new and improved design of self-lubricating bearing wherein a greater part of the contacting surface may be devoted to lubricant containing pockets without increasing the bearing pressure per unit of bearing surface.

Another object is to provide a new and improved self-lubricating bearing affording better lubrication of the bearing surfaces.

Another object is to provide a special shape of lubricant containing pocket providing improved feeding of lubricant to the bearing surfaces.

Another object is to provide means for controlling the rate of feeding the lubricant to the bearing surfaces.

Further objects and advantages will appear as the detailed description of my invention proceeds.

In the accompanying drawings, which illustrate a preferred embodiment of my invention, and wherein similar parts are designated by like reference characters throughout the several views:

Figure 1 is a perspective view of my improved bearing;

Figure 2 is a horizontal section thereof, taken along the line 2—2 of Figure 1;

Figure 3 is a vertical section taken substantially along the line 3—3 of Figure 2 and illustrating diagrammatically a tool for cutting the lubricant containing pockets or recesses;

Figure 4 is a detail illustrating the shape of the recesses; and

Figure 5 is a detail showing the recesses serrated to slightly retard the feeding of the lubricant to the bearing surfaces.

In the drawings I have illustrated my invention as applied to that type of bearing wherein a bushing 10, of brass or other suitable material, receives the rotating shaft (not shown). The bushing 10 may be carried directly in the frame of the machine or by a bracket attached to such a machine or other supporting means, or in any other manner suitable under the particular conditions of use of the bearing.

The bushing 10 is shown as provided with lubricant containing recesses 11, preferably of rectangular cross section and having the longest dimension of the rectangle extending circumferentially of the bearing surface.

In the illustrated embodiment each recess 11 is illustrated as having a bottom of arcuate shape lengthwise of the recess, the recess being formed preferably by a rotary cutter 12 (Figure 3) of smaller diameter than the bearing surface. The recess is of greatest depth at its center and tapers upwardly adjacent each end, forming a wedge-shaped section at each side of its center, thus necessarily providing a wedge-shaped surface tapered in the direction of rotation of the shaft. This is clearly illustrated in Figure 4 wherein the shaft is rotating in the direction of the arrow and the end 13 of the bearing forms a wedge-shaped portion tapering in the direction of rotation of the shaft.

This new and improved shape of lubricant containing recess causes the rotation of the shaft to crowd the lubricant into the tapering end 13 of the recess and the creation of a wedging action which forces lubricant between the rotating shaft and the metal surface of the bushing 10. This crowding and wedging action in the end 13 of the recess crowds and firmly packs the semi-solid lubricant into this end 13 of the recess and causes the lubricant to support part of the shaft load. The wedging and feeding action of this tapered construction of lubricant pocket affords a better feeding of the lubricant to the bearing surfaces, particularly when the bearing is subjected to relatively high pressures per unit of area, thereby affording a construction which will wear longer due to the improved lubrication of the metal bear- In my new and improved bearing it is possible to devote a greater part of the inner surface of the bushing to lubricant containing pockets without increasing the load per unit area on the metal contact surface of the bushing since the special design of my lubricant containing pocket results in part of the bearing load being carried by these pockets instead of the entire bearing load being confined solely to the metal contact surface of the bushing.

In Figure 5 I have illustrated a modified form of lubricant containing pocket wherein the bottom 15 is serrated to slightly retard the wedging of the lubricant into the end 13'. By varying the depth of these serrations it is possible to provide a bearing having substantially any desired rate of feed of lubricant to the metal bearing surfaces and also in which any desired proportion of the total bearing load is carried by the lubricant containing pockets.

The lubricant containing pockets 11 are distributed over the inner surface of the bushing in any desired manner, but are preferably arranged so as to evenly distribute the lubricant over the entire bearing surface. In the drawings I have illustrated a preferred arrangement of the lubricant containing recesses wherein the recesses are arranged in alternate and staggered rows extending lengthwise of the bearing. The recesses are of such width that every part of the length of the bearing has a lubricant containing recess except the narrow annuli at the ends of the bearing. It is to be understood that my invention is not limited to the illustrated grouping of the lubricant containing pockets but that these pockets may be arranged in any desired manner.

While I have described in detail a preferred embodiment of my invention, it is to be understood that I am not limited to the details described therein but that the scope of my invention is defined in the following claims.

I claim:

1. An article of manufacture comprising a self-lubricating bearing member having an elongated recess for lubricant, said recess tapering in depth from a point intermediate its ends toward the ends of said recess, and having its longest dimension extending substantially in the direction of rotation of a movable part carried by said bearing member, said recess having a substantially cylindrical surface formed on a radius of less diameter than the diameter of said bearing member.

2. An article of manufacture comprising a self-lubricating bearing member having a plurality of elongated recesses, having substantially cylindrical serrated surfaces, and having their longest dimension extending in the direction of rotation of a movable part carried by said bearing member, said recesses being arranged in series wherein the recesses of one series are staggered relative to the recesses of another series, and a filling of lubricating compound in said recesses.

In witness whereof, I hereunto subscribe my name this 28 day of April, 1928.

ROBERT H. WHITELEY.